(12) United States Patent
Agarwal et al.

(10) Patent No.: US 6,587,881 B1
(45) Date of Patent: Jul. 1, 2003

(54) SOFTWARE SERVER USAGE GOVERNOR

(75) Inventors: Sameet Agarwal, Redmond, WA (US); Wei Xiao, Redmond, WA (US); Michael Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/289,054

(22) Filed: Apr. 9, 1999

(51) Int. Cl.$^7$ ................................................ G06F 15/16
(52) U.S. Cl. ...................................... 709/225; 709/203
(58) Field of Search ................................ 709/105, 223, 709/224, 225, 226, 227; 713/200, 201; 717/176, 177; 345/741, 745

(56) References Cited

U.S. PATENT DOCUMENTS

| | | | |
|---|---|---|---|
| 5,023,907 A | * 6/1991 | Johnson et al. | 710/200 |
| 5,375,206 A | * 12/1994 | Hunter et al. | 717/176 |
| 5,617,570 A | * 4/1997 | Russell et al. | 709/312 |
| 5,732,218 A | * 3/1998 | Bland et al. | 709/224 |
| 5,894,554 A | * 4/1999 | Lowery et al. | 709/203 |
| 6,003,082 A | * 12/1999 | Gampper et al. | 709/225 |
| 6,189,033 B1 | * 2/2001 | Jin et al. | 709/225 |
| 6,209,024 B1 | * 3/2001 | Armstrong et al. | 709/212 |
| 6,314,465 B1 | * 11/2001 | Paul et al. | 709/226 |
| 6,330,602 B1 | * 12/2001 | Law et al. | 709/226 |
| 6,401,121 B1 | * 6/2002 | Yoshida et al. | 709/105 |
| 6,430,618 B1 | * 8/2002 | Karger et al. | 709/225 |

* cited by examiner

Primary Examiner—Mark R. Powell
Assistant Examiner—Marc D. Thompson
(74) Attorney, Agent, or Firm—Woodcock Washburn LLP

(57) ABSTRACT

A system and method for controlling usage of a particular software program in a computer network environment is disclosed. The invention operates by controlling the throughput of the software as it executes on a server computer. In particular, the invention monitors the number of active requests to the software. If the number of active requests exceeds a predefined number, the software throughput on the server (e.g., requests completed per minute) is artificially restricted. As such, the present invention continues to allow further connections to the software but intentionally restricts further use by inhibiting the throughput for all connections to the software. Preferably, the present invention continues to allow the predefined number of active requests to be exceeded, but as more requests are made, the overall performance of software progressively degrades.

19 Claims, 7 Drawing Sheets

```
Performance Model ( )
{
    If (Number of Acitve User Threads > TBU )
    {
        yield (Delay Array [Number of Acitve User Threads - TBU]);
    }
}
```
12a

Figure 7

SOFTWARE SERVER USAGE GOVERNOR

TECHNICAL FIELD

The present invention relates generally to computer systems and more particularly to the control over the usage of server software.

BACKGROUND OF THE INVENTION

The network computing model, in which client computers are connected to server computers, is quickly becoming the dominant computing model for small businesses, enterprises, Intranets, the Internet, and even homes. Cost and productivity are among the primary factors driving the changeover to the client server network model. The network computing model increases productivity by permitting users to share resources, and provides cost savings by providing a centralized location for maintaining and customizing certain aspects of the computer system.

As the network computing model continues to become a dominant computing paradigm, computer networks have become an increasingly important tool for users to share access to system resources such as programs, data, printers, and so on. Typically, such sharing of resources is provided by server software that handles requests from a plurality of users. A database server is one particularly important server software application that services requests from multiple users. Indeed, the database server provides one of the fundamental building blocks to enable the network computing model in that many other server applications, such as mail servers, file servers, Internet servers, and so on, are built on top of database servers.

As noted above, the network computing model is import to many different network configurations and scales. For example, the lower end of the network configuration scale includes homes or small businesses; whereas, the higher end of the scale includes enterprises or the Internet. Although these configurations may have different scales, they each operate on a nearly identical model of a plurality of users accessing a shared resource via a server computer.

But the different configuration scales may have very different economic forces shaping their development. For example, the value of the productivity and cost reduction gains of network computing may provide enough economic incentive to the users of the high end of the configuration scale to invest in the development of sophisticated server software. On the other hand, the economics at the lower end of the scale may not provide enough economic incentive to justify development to the same extent. These differences in economic incentives have resulted in a segmented server software market.

In addition to grappling with a segmented software market, for many years software developers have attempted to control the unauthorized use and distribution of software. For example, hardware and software keys have been used to inhibit unauthorized use of software. However, with the advent of computer networks in which software is loaded from or executed on a server computer, the key approach to unauthorized software use is impractical.

Moreover, the network environment to some extent provides even greater potential than a stand-alone software application for unauthorized use because of the nature of server software usage. That is, the use of the server software may be generally authorized while the type of its use is proscribed. For example, the server software may be authorized for use with up to a fixed number of users. However, determining whether the authorized limits have been exceeded may not be apparent to the users because they would have to know how many other users are simultaneously using the same server software. As a result, in some instances the user could be unaware that the authorized use of the server software has been exceeded.

Typically, in such network distribution and execution systems, software developers have attempted to control the unauthorized use of software by limiting the number of simultaneous users. That is, after a predefined number of users simultaneously connect to the software, further connections are prohibited. However, this limit on the number of users presents drawbacks, such as prioritizing access, improperly measuring the actual number of connections, and so on. For example, if a user remains connected to the server but makes no requests of the server software, the server software still counts the user as a connection toward the maximum allowable connections, potentially preventing an otherwise authorized user from gaining access. Moreover, it could also create deadlock problems when applications require multiple connections (i.e., making a first connection and requiring an unavailable connection for the application to complete an release the first connection).

A second approach to the problem of proscribing the use of the server software is to develop a completely separate product for each segment. In this approach, a product developed for and directed at the lower end segment typically lacks the features and power of a product developed for and directed at the higher end segment. As a result, the low end product, with its sparse features and lack of performance, simply does not match the needs of the high end user. Conversely, the high end product, with its rich feature and performance set, is too expensive for the low end user. This approach requires duplication of software development time in developing and maintaining two separate products.

Thus there is a need for an improved server software system that provides scalability to different market segments while providing control over the authorized usage of the software.

SUMMARY OF THE INVENTION

The present invention is directed to a system and method for controlling usage of a particular software program in a computer network environment. The invention operates by controlling the throughput of the software as it executes on a server computer. In particular, the invention monitors the number of active requests to the software. If the number of active requests exceeds a predefined number, the software throughput on the server (e.g., requests completed per minute) is artificially restricted. As such, the present invention continues to allow further connections to the software but intentionally restricts further use by inhibiting the throughput for all connections to the software. Preferably, the present invention continues to allow the predefined number of active requests to be exceeded, but as more requests are made, the overall performance of software progressively degrades.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention;

however, the invention should not limited to the specific methods and instrumentalities disclosed. In the drawings:

FIG. 7 is pseudo-code for carrying out another potion of the usage governor function.

DETAILED DESCRIPTION OF THE INVENTION

Overview

The present invention addresses the need for a system and method of controlling the usage of a server software program in a computer network environment. The invention operates by controlling the throughput to match the preset performance characteristics of the software as it executes on a server computer. In this way, the same server software can be tuned for a variety of market segments.

Exemplary Operating Environment

1. A Computer Environment

Figure 1:
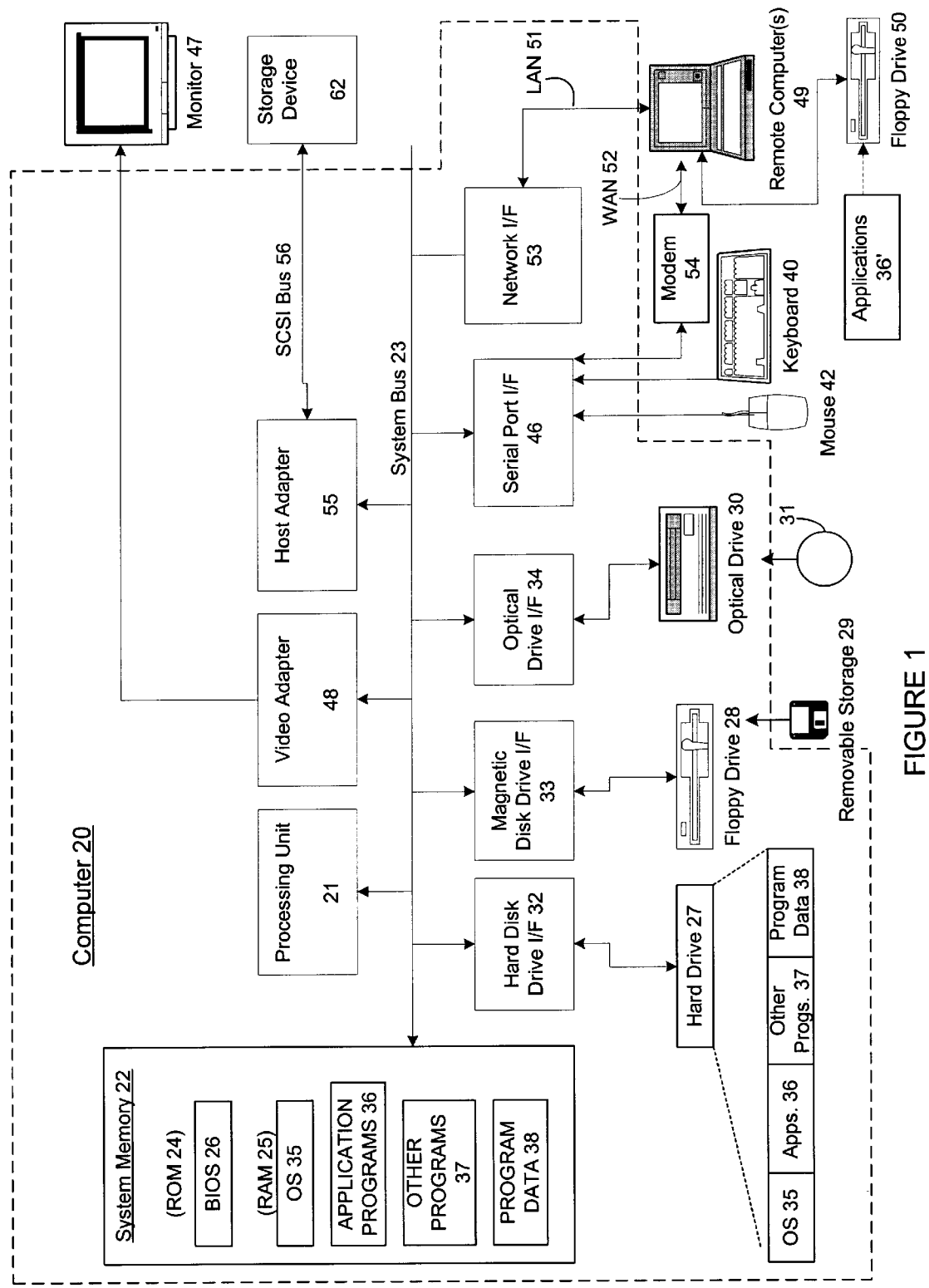
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide are network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
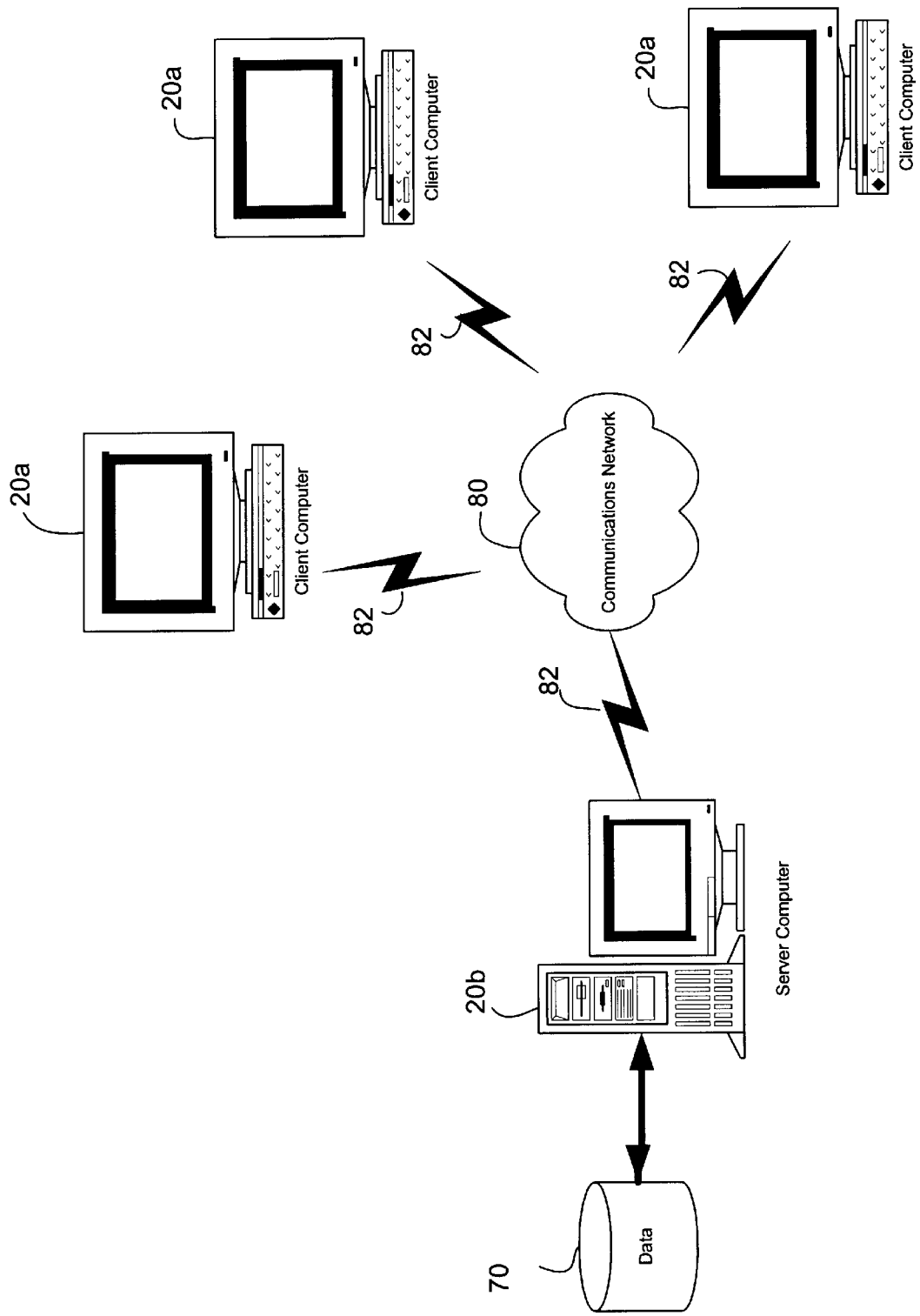
FIG. 2 is schematic diagram representing a network computer model in which aspects of the present invention may be incorporated.

FIG. 2 illustrates an exemplary network environment in which the present invention may be employed. Of course, actual network and server environments can be arranged in a variety of configurations; however, the exemplary environment shown here provides a framework for understanding the type of environment in which the present invention operates.

The network may include client computers 20a, a server computer 20b, and data 70 accessible via server computer 20b. The client computers 20a are in electronic communication with the server computer 20b via communications network 80, e.g., an Intranet. Client computers 20a are connected to the communications network by way of communications interfaces 82. Communications interfaces 82 can be any one of the well-known communications interfaces such as Ethernet connections, modem connections, and so on.

Server computer 20b provides management of data 70 by way of server software such as database server system software, described more fully below. As such, server 20b acts as a gatekeeper of data from a variety of data sources and provides that data to a variety of data consumers.

Client computers 20a that desire to use the data stored by server computer 20b can access the data 70 via communications network 80. In the example wherein server 20b comprises a database server, such as a SQL server, client computers 20a request the data by way of SQL queries (e.g., update, insert, and delete) on the data stored in database 70.

3. Database Systems

Although the present invention has applications to many types of software and server software applications in particular, such as e-mail systems, web servers, and the like, the invention is described herein in connection with a database server.

A data base server, is a software application that accepts queries to its database from a plurality of users. The database is a collection of related data. In one type of database, a relational database, data is organized in a two-dimensional column and row form called a table. Generally, data stored in a relational database is accessed by way of a user-defined query that is constructed in a query language such as SQL. Typically, for any given SQL query there are numerous procedural operations that need be performed on the data in order to carry out the objectives of the SQL query. For example, there may be numerous joins and table scans that need to be performed so as to accomplish the desired objective.

Server Software Usage Governor

Figure 3:
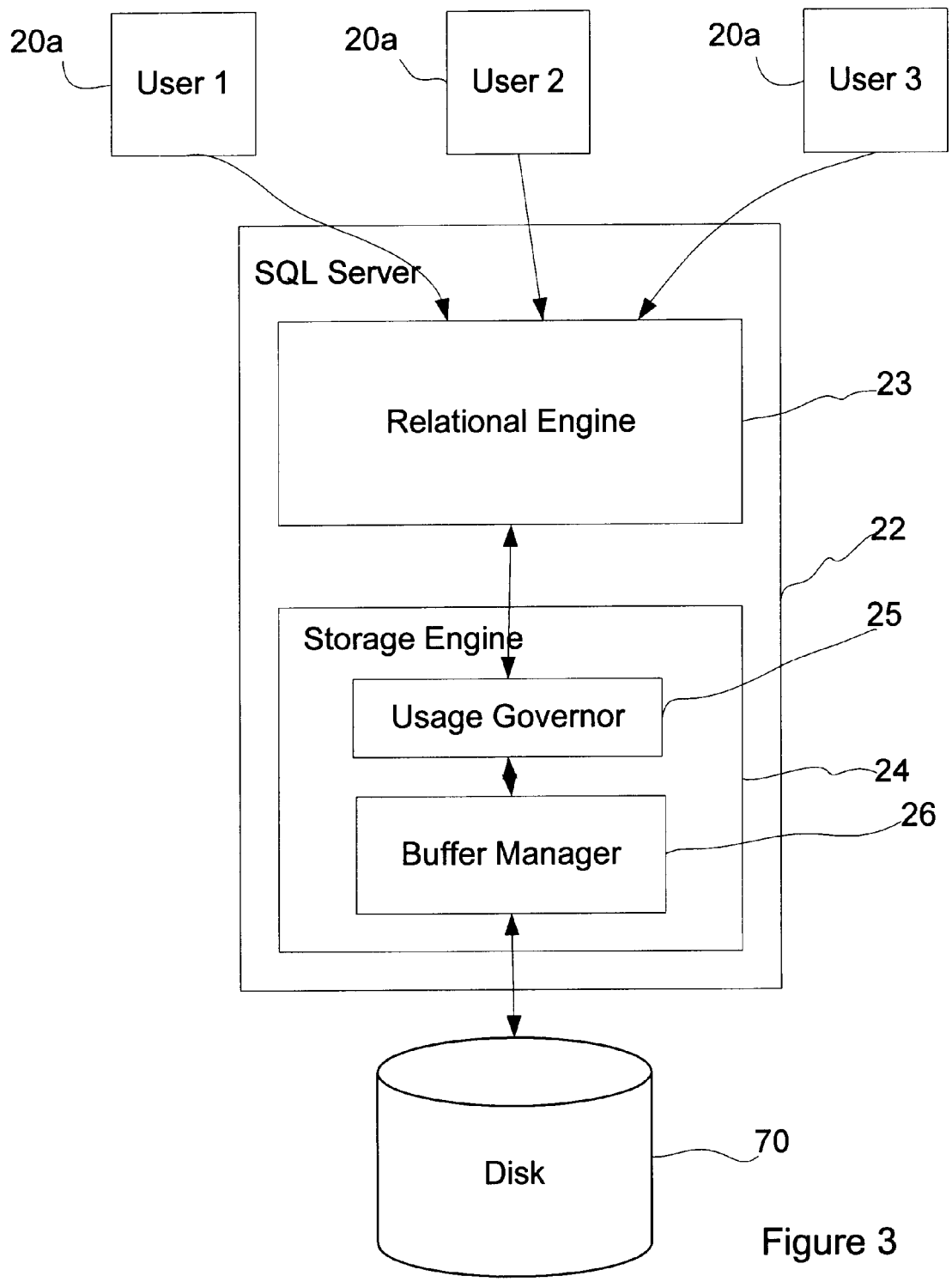
FIG. 3 is a block diagram of an exemplary database server application incorporating aspects of the present invention.

FIG. 3 is a block diagram of an exemplary SQL server software architecture. The SQL server software 22 comprises a set of computer readable instructions that execute on a server computer such as server computer 20b as shown in FIG. 2. SQL server 22 essentially comprises a relation engine 23, and storage engine 24. In general, relational engine 23 processes the queries into physical data requests. Storage engine 24 processes the physical data request by managing the interaction between transient copies of data stored in a buffer (i.e., RAM memory) and nonvolatile copies of the data stored on disk 70 according to well-understood transaction management principles.

According to an aspect of the present invention, the server software 22 comprises a usage governor 25 that controls the performance characteristics of server software 22. In general, through preset values in usage governor 22 the performance characteristics, e.g., the number of transactions processed per minute by server software 22, can be tuned to a specific target market segment, e.g., home, small business, enterprise and so on, without duplicating software development efforts.

Accordingly, the same server software code can be tuned for access by any number of users simply by adjusting the preset values. For example, if a particular installation of server software is licensed for up to four users the performance characteristics of the server can be tuned so that as additional users connect and access the server, the performance of the server degrades. Similarly, different performance characteristics can be set for 8 users, 16 users, and so on.

In the exemplary embodiment of FIG. 3, usage governor 25 is placed in storage engine 24 of SQL server 22. In this way the usage governor can control the performance of the server software 22 by controlling the access to the data controlled by buffer manager 26. In this embodiment, usage governor 25 controls performance by controlling access to a data storage resource. Similar concepts could apply by controlling access to other types of system resources accessed by a plurality of users such as printers, communication equipment, and so on.

In the exemplary embodiment of usage governor 25 with SQL server 22, SQL server software 22 accepts database queries from a plurality of users 20a (illustrated here as User 1, User 2, and User 3 corresponding to the physical client computers shown in FIG. 2). The queries are processed by a relation engine 23, which formulates the joins and table scans that need to be performed so as to accomplish the desired objectives of the particular query. While processing the queries, relation engine 23 may need to access data contained in the various database tables, which are stored in the disk 70.

Relation engine 23 accesses the data by way of storage engine 24. Storage engine 24 generally comprises buffer manager 26, which retrieves the data from either a buffer or from disk 70. Usage governor 25 exploits the need for access to buffer manager 26 to access data. Hence, by controlling the time required to access data, usage governor 25 can control the performance of server software 22.

Figure 4:
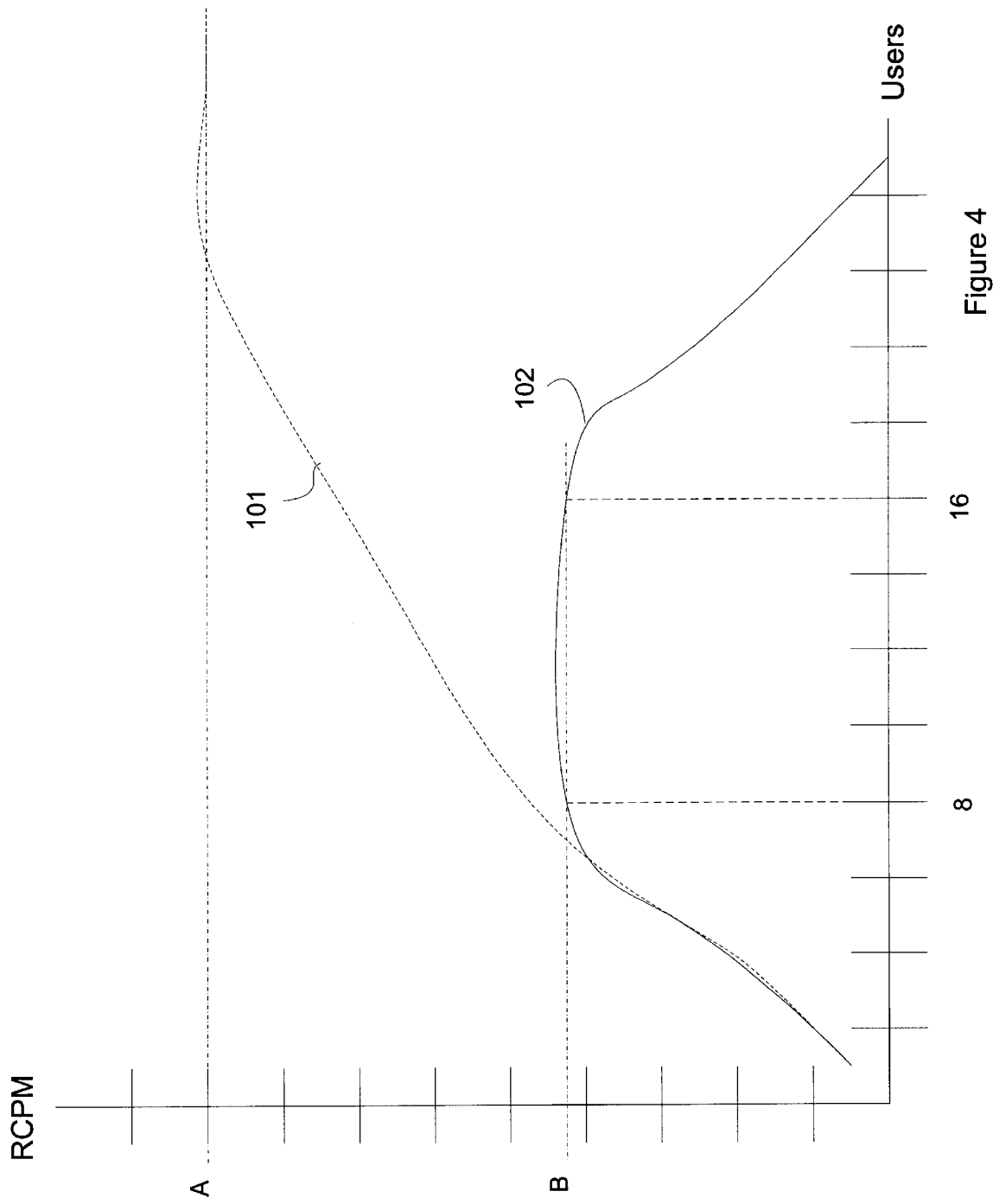
FIG. 4 graphically models how the performance of the server software performs with a specific exemplary performance model.

FIG. 4 illustrates by comparing two performance curves how the addition of usage governor 25 allows server software 22 to be tuned. The curve graphs requests completed per minute (RCPM) along the ordinate and graphs the number of users accessing server software 22 along the abscissa. Curve 101 represents server software 22 with usage governor 25 tuned for unlimited usage. As a result, as the number of users accessing server software 22 increases, the performance of server software 22 is constrained only by the underlying system constraints such as CPU speed, buffer size, disk access speed, and so on. Hence as more users are added, the number of RCPMs increases until the constraints of the system act to limit the maximum RCPMs proximate the limit line A.

By contrast, curve 102 represents server software 22 that shares identical code with server software 22 of curve 101; however, here, usage governor 25 has been tuned for eight users. With curve 102, as with curve 101, the number of RCPM generally increases as the number of users accessing server software 22 increases. However, unlike curve 101, the performance of server software 22 plateaus proximate limit line B after eight users simultaneously connect to the server software. Moreover, the usage governor can be tuned so that as the number of users continues to increase, server software extracts a small performance penalty. However, as the number of users added to the system progressively increases the performance of the server software can be made to degrade very quickly. This tuning is illustrated in curve 102 by the way that the curve rapidly decreases the number of RCPMs performed as the number of users exceeds sixteen.

By allowing server software 22 to continue functioning even after the number of authorized users is exceeded provides improved flexibility to the system. For example, server software 22 does not prevent additional users from connecting to the server in the case where a preexisting connect user is idle. Moreover, server system 22 can avoid deadlocks by allowing additional connections to be made as needed.

Figure 5:
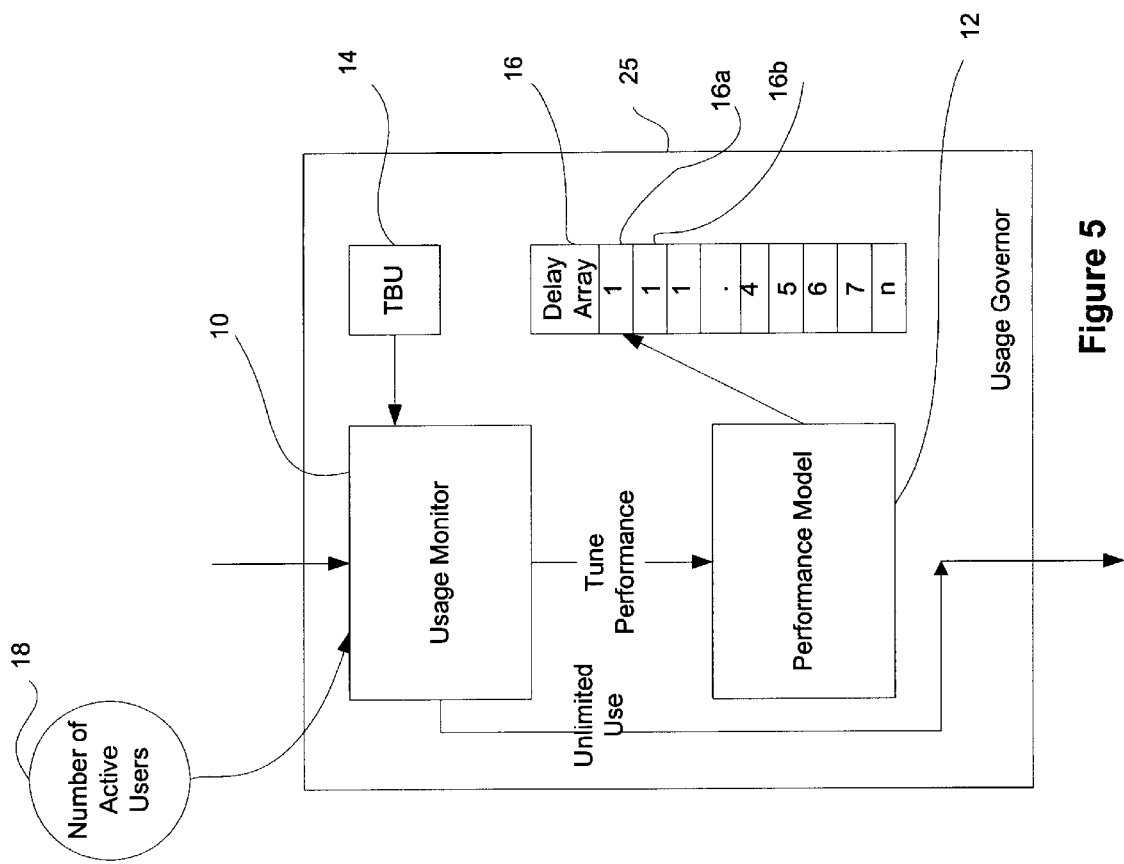
FIG. 5 is a block diagram of a usage governor in accordance with the present invention.

FIG. 5 illustrates an exemplary architecture for providing a set of tuning parameters for usage governor 25. Usage governor 25 comprises a usage monitor 10, and a performance model 12. Usage monitor 10 primarily determines whether the performance of server software 22 should be constrained at all. That is, where the server software is authorized for unlimited usage, usage monitor 10 would not attempt to model the performance characteristics of server software 22 and will instead immediately exit. In this way, usage governor 25 will have virtually no impact on the performance of server software 22.

Figure 6:
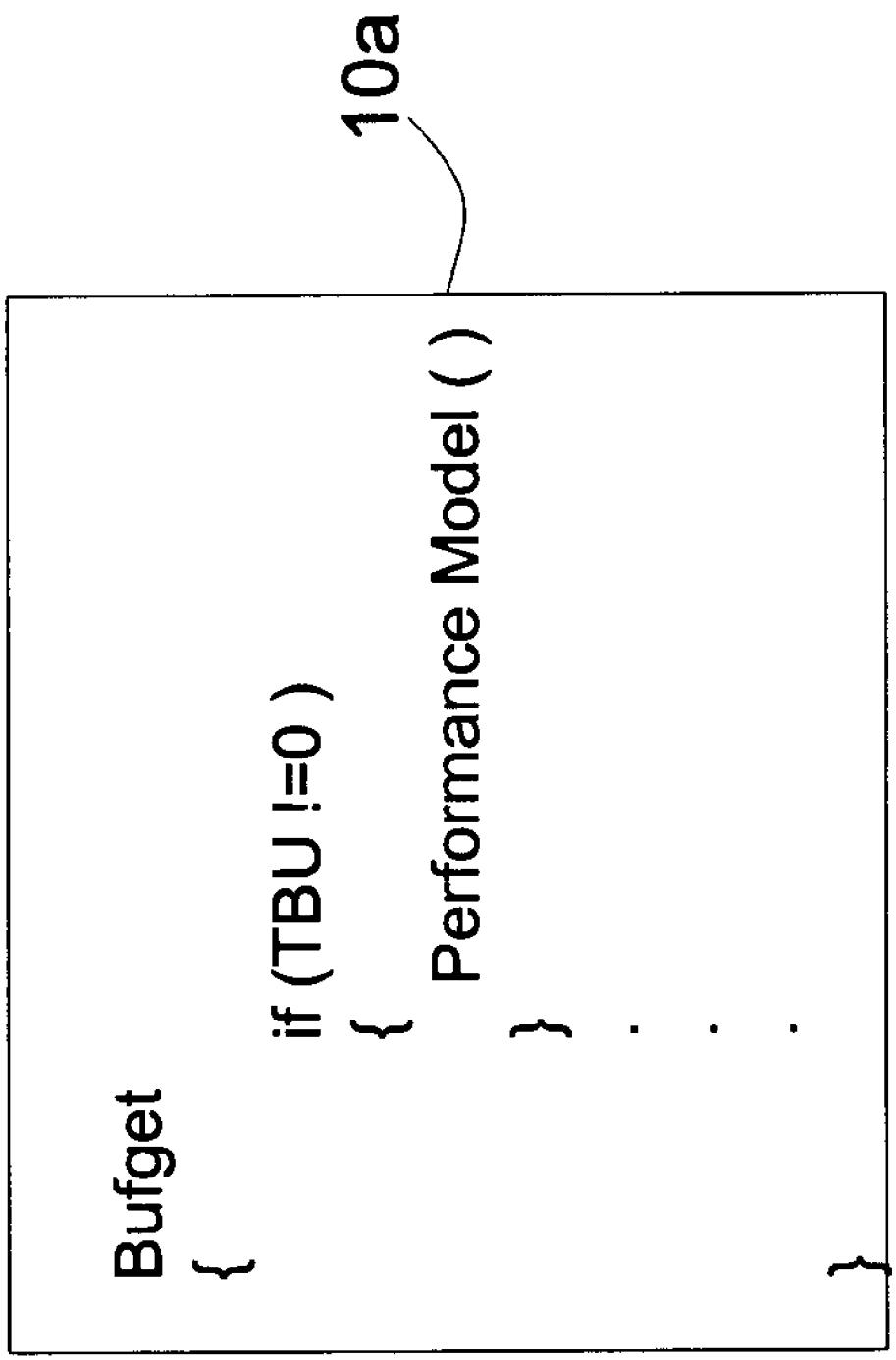
FIG. 6 is pseudo-code for carrying out a potion of the usage governor function.

The number of users authorized to simultaneously access server software 22 is controlled by setting Target Benchmark Users (TBU) 14. For example, referring briefly to curve 102 of FIG. 4, TBU would have been set to eight (8). Server software 22 can be set for unlimited usage by setting TBU to zero. Pseudo-code 10a for carrying out the function of Usage Monitor 10 is shown in FIG. 6. Here, code 10a for implementing usage monitor 10 has been integrated into bufget, a fairly common system call to access data from buffer manager 26. Essentially, usage monitor 10 comprises code 10a that test for TBU not equal to zero. If it is greater than zero, a call is made to Performance Model 12; otherwise control passes back and the bufget module functions as normal.

This modification to bufget illustrates how usage governor 25 can be integrated into any server software system, such as e-mail, web servers, database servers, and so on, with very little modification.

After the determination to test for violations, control passes to Performance Model 12. Performance Model 12 determines whether a violation has occurred, i.e., the number of authorized simultaneous users has been exceeded, and if so takes appropriate action to alter the performance characteristics of server software 22. Here, the performance parameters are controlled by the use of an array of delay values 16. Performance Model 12 selects a value from delay array 16 as a function of the magnitude of the violation, i.e., how many more simultaneous users than are authorized.

Notably, in the example of FIG. 5, array values 16a and 16b have identical values. Thus, the first few violations will result in the same impact on the performance of server software 22. Hence, by adjusting the values of delay array 16, usage governor 25 can be tuned so that it does not over-penalize the performance for minor violations.

FIG. 7 presents exemplary pseudo-code 12a for carrying out the function of Performance Model 12. Performance Model 12 determines the number of active user connections to server software 22. Hence a license violation will have occurred when the number of active user connections exceeds the TBU. One way to measure the number of active user connections is by proxy to the number of active user threads (NAUT). Pseudo-code 12a compares the NAUT to the TBU. As used herein, a thread is the information associated by server software 22 with one individual user or with a particular service request. Hence, the violation count is defined as NAUT−TBU. If a violation has occurred, the magnitude of the violation (e.g., NAUT−TBU) is used as an index into Delay Array 16. The value returned from Delay Array 16 is used to slow the number of requests per minute completed by server software 22 by calling the yield function, which essentially creates a time delay.

As a result, while the violation remains in effect (i.e., too many simultaneous users) each call by a user to access data from buffer manager 26 is delayed. However, should the violation cease (i.e., the number of simultaneous user connections returns to an authorized number), data access delays also cease.

As the above exemplary embodiments illustrate, a usage governor can be added to a server software application, such as a data base server. The usage governor can then be used to allow an otherwise identical server software application to be tuned to a preset number of users and have a preset performance characteristic. In this way, a single server software application can be licensed to a variety of market segments simply by modifying the tuning parameters.

While the invention is susceptible to various modifications and alternative constructions, certain illustrated embodiments have been shown in the drawings and accompanying detailed description. It should be understood, however, that there is no intention to limit the invention to the specific constructions disclosed herein. On the contrary, the invention is intended to cover all modifications, alternative constructions, and equivalents falling within the scope and spirit of the invention.

What is claimed is:

1. A method for controlling authorized use of software by governing computer system throughput, comprising the steps of:
    a) accepting a request for a system resource from one of a plurality of users;
    b) measuring the system throughput demand by inference from counting the number of substantially simultaneous user requests;
    c) comparing the throughput demand to a preset level by comparing the number of substantially simultaneous user requests to a preset number of authorized simultaneous user requests; and
    d) if system throughput demand exceeds the preset level, identifying a time delay derived from the number of substantially simultaneous user requests exceeding the preset number of authorized simultaneous user requests, and processing the request after when the time delay has expired.

2. The method as recited in claim 1 wherein the step of accepting the request for system resources, comprises a request for access to data storage.

3. The method as recited in claim 2 wherein the data storage comprises a buffer.

4. The method as recited in claim 2 wherein the data storage comprises a disk storage device.

5. The method as recited in claim 1 wherein the step of measuring system throughput comprises the step of measuring the number of active user threads.

6. A database server comprising computer-readable instructions for carrying out the steps recited in claim 1.

7. A computer-readable medium bearing computer-readable instructions for carrying out the steps recited in claim 1.

8. A method for controlling the use of software comprising the steps of:

a) providing a set of computer readable instructions wherein the instructions are capable of substantially simultaneously performing a predefined function for a plurality of users;

b) presetting the performance level of the set of computer readable instructions by presetting a measure of the number of authorized simultaneous users; and, c) providing a set of computer readable instructions for degrading the performance of the computer-readable instructions by identifying when an actual measure of simultaneous users exceeds the preset measure of the number of authorized simultaneous users, identifying a time delay derived from the number of simultaneous users exceeding the preset measure, and processing a request when the time delay has expired.

9. The method as recited in claim 8 wherein the set of computer-readable instructions comprise a portion of a database server.

10. The method as recited in claim 8 wherein the measure of the number of users comprises a number of active user threads.

11. The method as recited in claim 8 wherein the time delay is increased as a function of the number of active users in excess of the number of authorized users.

12. The method as recited in claim 1 wherein the step of presetting the measure of the number of authorized simultaneous users comprises the step of selecting.

13. A computer-readable medium bearing computer-readable instructions for carrying out the steps recited in claim 8.

14. A computer-based server, comprising:

a set of computer readable instructions for servicing a plurality of user requests for data access; and a usage governor for controlling the performance of the computer-based server, wherein a performance characteristics of the computer-based server is tunable for a predetermined number of users such that if system throughput demand exceeds the predetermined number of users, a time delay derived from the number of users exceeding the predetermined number of users is identified and processing of a request takes place when the time delay has expired.

15. The computer-based server as recited in claim 14 wherein the server is a database server.

16. The computer-based server as recited in claim 14 wherein the performance characteristic is the number of requests completed by the computer-based server over a measure amount of time.

17. The computer-based server as recited in claim 16 wherein the performance characteristics of the computer-based server can be tuned to a predefined performance curve such that the performance characteristics follow the curve for a given number of simultaneous users.

18. The computer-based server as recited in claim 14 wherein the predetermined number of users can be preset based on a particular market segment.

19. The computer-based server as recited in claim 18 wherein the market segment is based on a maximum number of users.

* * * * *

UNITED STATES PATENT AND TRADEMARK OFFICE
CERTIFICATE OF CORRECTION

PATENT NO.   : 6,587,881 B1
DATED        : July 1, 2003
INVENTOR(S)  : Agarwal et al.

It is certified that error appears in the above-identified patent and that said Letters Patent is hereby corrected as shown below:

Column 2,
Line 24, please delete "an" and insert therefore -- and --;

Column 4,
Line 53, please delete "are" and insert therefore -- area --.

Signed and Sealed this

Sixteenth Day of March, 2004

JON W. DUDAS
*Acting Director of the United States Patent and Trademark Office*